(12) United States Patent
Klatt (10) Patent No.: US 10,570,842 B2
(45) Date of Patent: Feb. 25, 2020

(54) HANDHELD WORK APPARATUS

(71) Applicant: Andreas Stihl AG & Co. KG, Waiblingen (DE)

(72) Inventor: Clemens Klatt, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/129,637

(22) Filed: Sep. 12, 2018

(65) Prior Publication Data

US 2019/0085779 A1    Mar. 21, 2019

(30) Foreign Application Priority Data

Sep. 15, 2017  (DE) .................. 10 2017 008 755
Apr. 9, 2018   (DE) .................. 10 2018 002 964

(51) Int. Cl.

| | |
|---|---|
| *F02D 41/00* | (2006.01) |
| *F02D 41/06* | (2006.01) |
| *F02P 5/04* | (2006.01) |
| *F02P 5/15* | (2006.01) |
| *F02P 11/02* | (2006.01) |

(Continued)

(52) U.S. Cl.
CPC ............ *F02D 41/067* (2013.01); *F02B 63/02* (2013.01); *F02D 41/20* (2013.01); *F02N 3/02* (2013.01); *F02P 5/045* (2013.01); *F02P 5/1506* (2013.01); *F02P 11/025* (2013.01); *F02D 2200/101* (2013.01); *F02D 2400/04* (2013.01); *F02D 2400/06* (2013.01)

(58) Field of Classification Search
CPC .... F02B 63/02; F02D 41/067; F02D 2400/06; F02N 3/02; F02P 5/045; F02P 5/1506
See application file for complete search history.

(56) References Cited

U.S. PATENT DOCUMENTS

| | | | | |
|---|---|---|---|---|
| 5,076,411 A | * | 12/1991 | Kramer | ............... B27B 17/0008 123/198 D |
| 5,551,395 A | * | 9/1996 | Isaacs | .................... F02B 63/02 123/179.3 |

(Continued)

FOREIGN PATENT DOCUMENTS

| | | |
|---|---|---|
| DE | 19844173 A1 | 3/2000 |
| DE | 102007031396 A1 | 1/2009 |

(Continued)

*Primary Examiner* — Thomas N Moulis
(74) *Attorney, Agent, or Firm* — Walter Ottesen, P.A.

(57) ABSTRACT

A handheld work apparatus has a combustion engine, a pull-rope starter, and a stop button for switching off the combustion engine. A throttle element is arranged in an intake channel of the combustion engine. The work apparatus has a control device for activating a spark plug and a fuel valve. The control device has a starting mode wherein the combustion engine can be started via the pull-rope starter, and an operating mode wherein the operator can adjust the throttle to vary the rotational speed (n) of the combustion engine. The operating and starting mode differ in terms of the control of ignition time and fuel quantity to be supplied. When the combustion engine is started from the switched-off state, the control device is automatically in starting mode, such that after the combustion engine is switched off, the work apparatus is immediately ready for restarting via the pull-rope starter.

18 Claims, 7 Drawing Sheets

(51) Int. Cl.
*F02B 63/02* (2006.01)
*F02D 41/20* (2006.01)
*F02N 3/02* (2006.01)

(56) References Cited

U.S. PATENT DOCUMENTS

| | | | |
|---|---|---|---|
| 7,449,994 B1 | 11/2008 | Koerner et al. | |
| 7,894,974 B2 | 2/2011 | Baehner et al. | |
| 8,661,951 B2 | 3/2014 | Gorenflo | |
| 9,068,521 B2 | 6/2015 | Naegele et al. | |
| 9,103,289 B2 | 8/2015 | Gwosdz et al. | |
| 9,664,143 B2 | 5/2017 | Osburg et al. | |
| 2001/0025624 A1* | 10/2001 | Kramer | A01D 34/90 123/396 |
| 2002/0174853 A1* | 11/2002 | Suzuki | F02D 37/02 123/339.23 |
| 2003/0010297 A1* | 1/2003 | Strom | F02D 41/06 123/73 A |
| 2006/0070594 A1* | 4/2006 | Pattullo | F02M 1/02 123/179.18 |
| 2006/0247841 A1 | 11/2006 | Ono | |
| 2007/0295298 A1* | 12/2007 | Mark | A01G 3/053 123/185.4 |
| 2010/0224384 A1* | 9/2010 | Gwosdz | B25F 5/02 173/217 |
| 2010/0224466 A1* | 9/2010 | Leinmuller | B25F 5/001 200/1 B |
| 2014/0000542 A1* | 1/2014 | Karrar | F02B 63/02 123/179.3 |
| 2014/0299098 A1 | 10/2014 | Raffenberg et al. | |
| 2014/0366828 A1* | 12/2014 | Eberle | F02B 63/02 123/179.1 |
| 2015/0047593 A1 | 2/2015 | Geyer et al. | |
| 2016/0123256 A1* | 5/2016 | Yoshizaki | F02B 63/02 477/175 |
| 2016/0356255 A1* | 12/2016 | Albinger | F02D 41/042 |
| 2017/0074227 A1 | 3/2017 | Banzhaf et al. | |
| 2018/0347490 A1* | 12/2018 | Kuroiwa | F02B 63/02 |

FOREIGN PATENT DOCUMENTS

| | | |
|---|---|---|
| DE | 102009036372 A1 | 2/2011 |
| DE | 202011000519 U1 | 6/2012 |
| DE | 102013009669 A1 | 12/2014 |
| EP | 2087973 A1 | 8/2009 |
| EP | 2481905 A1 | 8/2012 |
| EP | 2607673 A1 | 6/2013 |
| EP | 2787215 A2 | 10/2014 |
| EP | 3144521 A2 | 3/2017 |

\* cited by examiner

HANDHELD WORK APPARATUS

CROSS REFERENCE TO RELATED APPLICATION

This application claims priority of German patent application nos. 10 2017 008 755.5, filed Sep. 15, 2017, and 10 2018 002 964.7, filed Apr. 9, 2018, and the entire contents of both applications are incorporated herein by reference.

BACKGROUND OF THE INVENTION

For handheld work apparatuses having a combustion engine for driving a tool of the work apparatus, it is known, for the starting of the combustion engine, to actuate a starting device via a manually actuated pull-rope starter. Such a starting device may for example include a choke element. It is known for such starting devices to be adjusted manually by the operator into the starting position. As soon as the engine is running and the operator opens up the throttle, it is known for mechanically locked starting systems to automatically unlock and release the starting position. Prior to the next starting of the combustion engine, the operator must actuate the starting device once more.

DE 20 2011 000 519 U1 has disclosed a handheld work apparatus in the case of which a choke and a half-open throttle are automatically activated after the starting of the engine. This may be realized via an activation spring. A choke element is provided for the starting position.

SUMMARY OF THE INVENTION

It is an object of the invention to provide a handheld work apparatus which has a simple construction and in which operating errors during the starting of the combustion engine are avoided.

The object can, for example, be achieved via a handheld work apparatus having: a tool; a combustion engine for driving the tool; a manually actuated pull-rope starter for the combustion engine; a stop button configured to be actuated by an operator for switching off the combustion engine; a centrifugal clutch; the combustion engine having a crankcase and a crankshaft mounted in the crankcase; the crankshaft being operatively connected to the tool via the centrifugal clutch; the combustion engine having an intake channel; a throttle element arranged in the intake channel; the combustion engine having a spark plug and a fuel valve; a control device for activating the spark plug and the fuel valve; the control device having a starting mode wherein the combustion engine can be started via the pull-rope starter; the control device further having an operating mode wherein the operator can activate the combustion engine by adjustment of the throttle element in order to vary a rotational speed (n) of the combustion engine; the operating mode and the starting mode differing in terms of control, via the control device, of ignition time (ZZP) and fuel quantity to be supplied; and, wherein, in the case of the combustion engine being started from a switched-off state, the control device is automatically in the starting mode.

The object can, for example, also be achieved via a handheld work apparatus having: a tool; a combustion engine for driving the tool; a manually actuated pull-rope starter for the combustion engine; a stop button configured to be actuated by an operator for switching off the combustion engine; a centrifugal clutch; the combustion engine having a crankcase and a crankshaft mounted in the crankcase; the crankshaft being operatively connected to the tool via the centrifugal clutch; the combustion engine having an intake channel; a throttle element arranged in the intake channel; a throttle trigger defining a first end position and a second end position; the throttle element being adjustable by the operator using the throttle trigger between the first end position and the second end position; the first end position being assigned to an idling state and the second end position being assigned to a full-load state; the combustion engine having a spark plug and a fuel valve; a control device for activating the spark plug and the fuel valve; the control device having a starting mode wherein the combustion engine can be started via the pull-rope starter; the control device further having an operating mode wherein the operator can activate the combustion engine by adjustment of the throttle element in order to vary a rotational speed (n) of the combustion engine; wherein the throttle element is the only controllable throttle element arranged in the intake channel; and, wherein the throttle element is disposed in the first end position during a starting process.

The work apparatus has a starting mode, in which the combustion engine can be started via a pull-rope starter. The work apparatus furthermore has an operating mode, in which the operator can activate the combustion engine by adjustment of the throttle element in order to vary the rotational speed of the combustion engine. The work apparatus has a control device which is provided for activating a spark plug and a fuel valve of the combustion engine. Via the control device, it is thus possible to control whether an ignition occurs, and the ignition time and the fuel quantity to be supplied to the combustion engine can be controlled.

In a first embodiment, the disclosure provides for the operating mode and the starting mode of the work apparatus to be an operating mode and a starting mode of the control device, and for the operating mode and the starting mode to differ in terms of the control, via the control device, of ignition time and fuel quantity to be supplied, and for the control device to automatically be in the starting mode in the case of the combustion engine being started from the switched-off state. The switched-off state of the combustion engine is thus the state in which the control device is deenergized.

The present disclosure accordingly does not provide a mechanical starting device. Rather, the starting mode and operating mode are set electronically via the control device, specifically through activation, corresponding to the starting mode or the operating mode respectively, of fuel valve and spark plug. Mechanical components for the starting mode, for example a choke flap for setting the starting mode, can therefore be omitted. Also, mechanical components for releasing the starting mode or for ending the starting mode are not required. By virtue of the fact that, after the combustion engine is switched off via the stop button, the work apparatus is automatically adjusted into the starting mode by action on the control device, the work apparatus is ready, after the switching-off process, for the next cranking process, such that the operator does not have to actuate a starting device in order to start the combustion engine.

The control device of the combustion engine is preferably automatically in the starting mode when the control device wakes up upon the following starting process, in particular when the cranking rope is pulled. Here, the controller wakes up in particular from the fully deenergized state. The adjustment of the combustion engine from the operating mode into the starting mode accordingly takes place when the control device is deenergized, that is, after the deactivation of the control device, in particular after a microprocessor of the control device has been deactivated by being shut down. If the cranking rope is pulled again immediately after the combustion engine is switched off via the stop button, that is, for as long as the control device is not yet fully deenergized, provision may also be made for the work apparatus to be started again in the operating mode.

Provision can advantageously be made whereby, in the starting mode, in particular to the point at which a first combustion is detected, standard values are used for ignition time and fuel quantity, and control of ignition time and/or fuel quantity is performed only after the first combustion has been detected.

The adjustment into the starting mode is realized electronically via the software of the control device. In the case of starting from the fully deenergized state, the control device is always in the starting mode. By virtue of the fact that the supply of fuel takes place via a fuel valve, the supplied fuel quantity can be controlled within broad limits, such that, even in the presence of low temperatures, starting of the combustion engine is possible without actuation of a choke element in the intake channel. Here, the fuel valve can supply the fuel directly into the intake channel. A supply of the fuel directly into a crankcase of the combustion engine may also be advantageous. Provision may however also be made for the fuel valve to be arranged in a carburetor of the combustion engine and to control the fuel quantity that is supplied to one or more fuel openings which discharge into the intake channel. In this case, the supplied fuel quantity is dependent both on the activation of the fuel valve and on the negative pressure in the intake channel.

The operating mode and the starting mode can advantageously differ only in terms of the control, via the control device, of ignition time and fuel quantity to be supplied. In particular, the operating mode in the case of a non-actuated throttle element, in particular non-actuated throttle trigger of the work apparatus, and the starting mode do not differ in terms of the free flow cross section of the intake channel.

It can be advantageous for a single controllable throttle element to be arranged in the intake channel. The operator acts on the single controllable throttle element, for example via a throttle trigger, in order to set the rotational speed of the combustion engine during operation. A further throttle element, in particular a choke element, is accordingly not provided in the intake channel. This yields a simple construction of the work apparatus. The throttle element can advantageously be adjustable by an operator, using a throttle trigger, between a first end position and a second end position. Here, the first end position is preferably assigned to the idling state, and the second end position to the full-load state. In the starting mode, the throttle element can advantageously be situated in the first end position. Accordingly, the throttle element is situated in the same position in the starting mode as in the idling state. This position of the throttle element is positively realized when the operator is not actuating the throttle trigger of the work apparatus. However, during cranking, an actuation of the throttle trigger is not provided, because the operator requires both hands to hold the work apparatus and actuate the cranking device. A starting position of the throttle element, which differs from the idling position, is accordingly not provided. The free flow cross section of the intake channel can advantageously be the same for the starting mode and for idling operation.

The throttle element may advantageously have at least one opening which, in the first end position, provides a defined opening cross section. The opening cross section of the at least one opening determines, possibly together with one or more bypass channels, the free cross section of the intake channel in the starting mode. By virtue of the fact that the opening cross section in the starting mode is defined by at least one opening of the throttle element and one or more bypass channels, the free flow cross section in the first end position can be predefined very exactly. It can be advantageous for at least one bypass channel past the throttle element to be provided, the free flow cross section of which bypass channel is exactly set in particular during the production of the work apparatus, for example via a setting screw. In this way, the free flow cross section and thus the air quantity during starting and idling can be set very exactly, and is not dependent on the accuracy of the free flow cross section in the case of a partially open starting position of the throttle flap.

The control device may advantageously be adjusted from the starting mode into the operating mode when the throttle element is adjusted by the operator from the first end position in the direction of the second end position. The starting mode is accordingly deactivated when the operator opens the throttle element, that is, opens up the throttle. The deactivation of the starting mode also takes place only in the control device. A mechanical actuation of components of the work apparatus by the control device for the purposes of adjusting the work apparatus from the starting mode into the operating mode is not provided.

Provision may be made for an adjustment of the control device from the starting mode into the operating mode to take place at the earliest when at least one combustion has taken place in the combustion chamber of the combustion engine. In an embodiment, an adjustment of the control device from the starting mode into the operating mode takes place at the earliest when a predefined number of engine cycles have been run through after the first combustion of the combustion engine after starting. The predefined number of engine cycles can advantageously be 5 engine cycles to 100 engine cycles.

Only when the predefined number of engine cycles, in particular the number of engine cycles stored in the control device, has been run through does an adjustment of the throttle element by the operator from the first end position in the direction of the second end position have the effect that the control device is adjusted from the starting mode into the operating mode. For as long as the predefined number of engine cycles has not been run through, an adjustment of the throttle element by the operator from the first end position in the direction of the second end position does not give rise to an adjustment into the operating mode.

When the throttle element is adjusted by the operator from the first end position in the direction of the second end position, the free flow cross section in the intake channel is increased in size. The adjustment of the throttle element from the first end position in the direction of the second end position can therefore be easily detected via a pressure sensor on the basis of the pressure downstream of the throttle element. The adjustment from the starting mode into the operating mode may advantageously be performed on the basis of the pressure downstream of the throttle element. In an alternative advantageous embodiment, it is also possible for a sensor to be provided, which detects when the throttle element is at least partially, in particular fully, open. Provision may alternatively also be made for the rotational speed of the combustion engine to be monitored and for the control device to be adjusted from the starting mode into the operating mode when a rotational speed threshold has been overshot.

The control device may advantageously limit the rotational speed of the internal combustion engine in the starting mode to a starting rotational speed. The limitation of the rotational speed of the internal combustion engine in the starting mode may advantageously be realized by adjustment of the ignition time and/or by suppression of the ignition spark and/or by variation of the supplied fuel quantity.

The combustion engine drives the tool via a centrifugal clutch. The centrifugal clutch can advantageously have a clutch-engagement rotational speed range which extends from a lower clutch-engagement rotational speed to an upper clutch-engagement rotational speed. Below the lower clutch-engagement rotational speed, the output part of the centrifugal clutch is not driven by the drive part. Above the upper clutch-engagement rotational speed, the drive part and output part have the same rotational speed. The clutch-engagement process takes place between the lower and the upper clutch-engagement rotational speeds, and the drive part drives the output part along to an ever increasing degree with increasing rotational speed. To ensure that the tool cannot be driven in the starting mode, provision is made for the lower clutch-engagement rotational speed to be at least 25% higher than the starting rotational speed. In this way, a large safety margin between the starting rotational speed and the clutch-engagement rotational speed is maintained. This is provided in particular in the case of work apparatuses in which, aside from the pulling on the cranking rope, no further actuation of an operating element is required for starting the combustion engine, in particular also no manual actuation of a starting device of the combustion engine.

The combustion engine advantageously may have a temperature sensor which detects the temperature in the crankcase interior. The signal of the temperature sensor is in particular supplied to the control device. The temperature in the crankcase interior is utilized by the control device in particular together with further influential variables in order to decide whether, upon the starting of the internal combustion engine, a hot start or a cold start is being performed, and in order to control fuel quantity and ignition time in a correspondingly suitable manner. The supplied fuel quantity and the ignition time are in particular activated in the starting mode in a manner dependent on the temperature in the crankcase interior. The distinction between cold start and hot start is advantageously made automatically via the control device.

The handheld work apparatus may advantageously have a further temperature sensor which detects the ambient temperature and/or the intake temperature. The further temperature sensor can advantageously be arranged in the vicinity of the outer side of the handheld work apparatus. Via the data from a temperature sensor which detects the crankcase temperature and from the further temperature sensor, which detects the ambient temperature and/or the intake temperature, a distinction between hot start and cold start can be more easily made.

The fuel valve may advantageously have a discharge opening which discharges into the intake channel downstream of the throttle element. It can be advantageous if the entire fuel quantity to be supplied to the internal combustion engine is supplied via a single fuel valve. Provision is made for the intake channel to discharge into the crankcase interior via an inlet window, the inlet window being controlled by a piston of the combustion engine. The fuel valve advantageously supplies the fuel through the intake channel into the crankcase interior when the inlet window is open. Here, the fuel valve can advantageously be oriented such that fuel emerging from the discharge opening of the fuel valve can, when the piston is at top dead center, flow in a straight line into the crankcase interior. In this way, it is possible in particular during idling for the quantity of fuel that remains in the intake channel and precipitates on the intake channel walls to be minimized. The fuel is supplied substantially entirely directly to the crankcase interior. Here, the time at which the fuel is supplied does not need to lie, or does not need to lie entirely, within the time period for which the inlet window is open, because, owing to the pressure fluctuations in the intake channel, delays may occur between the emergence of the fuel from the discharge opening and the entry into the inlet window. The fuel valve can advantageously be oriented such that fuel emerging from the discharge opening of the fuel valve enters the intake channel transversely with respect to the flow direction in the intake channel, in particular at an angle of 20° to 160°, preferably at approximately right angles, with respect to the flow direction in the intake channel.

In a second embodiment, provision is made for a single throttle element to be arranged in the intake channel of the combustion engine, and for the throttle element to be situated in the first end position in the starting mode of the work apparatus. The first end position of the throttle element is in this case assigned to the idling state. Accordingly, the throttle element is in its idling position in the starting mode. A further throttle element for reducing the size of the free flow cross section in the intake channel is not provided.

The work apparatus accordingly has no starting device. The cranking of the combustion engine is made possible exclusively through suitable control of the combustion engine. This yields a simple construction of the work apparatus. Operation is made easier because the operator does not have to actuate a starting device before the cranking process. Elements of a starting device such as a choke element and one or more setting elements for the manual or automatic setting of a starting position of the choke element can be omitted.

For the cranking of the combustion engine, a starting mode of the control device is preferably provided. Provision may however also be made for the combustion engine to be activated in the same way during cranking and during operation, in particular in the idling state, and for the fuel quantity and ignition time to be controlled in accordance with the same control algorithms during the starting process and during operation.

An independent concept of the disclosure relates to the configuration of a throttle linkage of a handheld work apparatus. For a handheld work apparatus having a combustion engine for driving at least one tool of the work apparatus and having a handle on which a throttle trigger for actuation by the operator is pivotally mounted, wherein the combustion engine has a cylinder with a cylinder longitudinal axis, has a crankshaft which is driven in rotation about a crankshaft axis, a fuel valve for the supply of fuel, and an intake channel, wherein a section of the intake channel is formed in a throttle housing in which a throttle element with a bearing shaft is pivotally mounted, wherein the work apparatus has a longitudinal center plane which includes the cylinder longitudinal axis and which runs perpendicular to the rotational axis of the crankshaft, provision is made for the bearing shaft to enclose an angle of less than 10° with the longitudinal center plane, for the throttle element to be coupled, at a coupling section of the bearing shaft which projects out of the throttle housing, via a throttle linkage to the throttle trigger, and for the coupling section to be arranged at that end of the bearing shaft which, in the rest position of the work apparatus, faces toward the rest surface.

Here, the rest position of the work apparatus is a position of the work apparatus in which the work apparatus is resting on a horizontal, planar rest surface. The work apparatus may for example rest with setting feet, provided for the resting of the work apparatus, or with an underside of the work apparatus, on the rest surface.

By virtue of the coupling between bearing shaft and gas linkage being realized at a coupling section which projects out of the throttle housing and which is arranged at that end of the bearing shaft which faces toward the rest surface in the rest position of the work apparatus, it is possible to realize a very small spacing between coupling section and throttle trigger. In this way, a very short throttle linkage is made possible, which leads to low tolerances. The inherent flexibility of the gas linkage can also be kept low, which leads to a good response behavior. The arrangement of the bearing shaft at an angle of less than 10° with respect to the longitudinal center plane yields a simple configuration with low tolerances, because the actuation travel of the throttle trigger and the actuation movement of the coupling section are realized as rotational movements about axes which are approximately perpendicular to one another.

In an embodiment, the throttle shaft runs parallel to the longitudinal center plane. The coupling section may advantageously, in the rest position, be arranged at the same height as the pivot axis of the throttle trigger or above the pivot axis of the throttle trigger. The spacing of the coupling section to the rest surface may, in the rest position, advantageously be at least as great as the spacing of the pivot axis of the throttle trigger to the rest surface. This yields an advantageous arrangement of the components, and a short gas linkage with low tolerances is made possible.

The throttle housing can, for example, have exactly two fastening points for the fixing to a housing part of the work apparatus. Here, the fastening points may advantageously be arranged symmetrically with respect to the central axis of the coupling section. In a viewing direction in the direction of the intake channel longitudinal axis, it may be advantageous if a connecting line between a fastening point and the intake channel longitudinal axis encloses with the central axis of the coupling section an angle of 80° to 100°, in particular of 90°, about the intake channel longitudinal axis. The fastening points can preferably be arranged symmetrically with respect to a plane which includes the bearing shaft axis and the intake channel longitudinal axis. In this way, distortions of the bearing shaft axis can be kept small, such that in this case too, high levels of accuracy can be achieved, because mechanical tolerances are low. The bearing shaft axis and the central axis of the coupling section may advantageously coincide and the terms preferably denote the same axis.

It can be advantageous for the diameter of the intake channel in the throttle housing to be constant. The thickness, measured in the direction of the intake channel longitudinal axis, of the throttle housing can advantageously be relatively small. The thickness, measured in the direction of the intake channel longitudinal axis, of the throttle housing can preferably be less than 0.5 times the diameter of the intake channel in the throttle housing. It is preferable for a single throttle element to be arranged in the throttle housing. The handle and the throttle housing may advantageously be decoupled in terms of vibrations from the cylinder of the combustion engine. In this way, no or only very small vibration-induced displacements can occur between the handle and the throttle housing. The handle and the throttle housing can preferably be fixedly connected to one another. The handle is in particular formed on a tank housing of the work apparatus. The throttle housing is fixed to the tank housing. The tank housing can advantageously be a handle housing on which at least one handle of the work apparatus is arranged and which is decoupled in terms of vibrations from the combustion engine.

The throttle housing can advantageously be fixed to a housing part of the work apparatus, and a stop for defining the full-load position of the throttle element is arranged on the housing part. In this way, low tolerances are achieved in terms of the positioning of the throttle element in the full-load position. In particular, the throttle trigger is also mounted on the housing part. The housing part can preferably be the tank housing or handle housing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
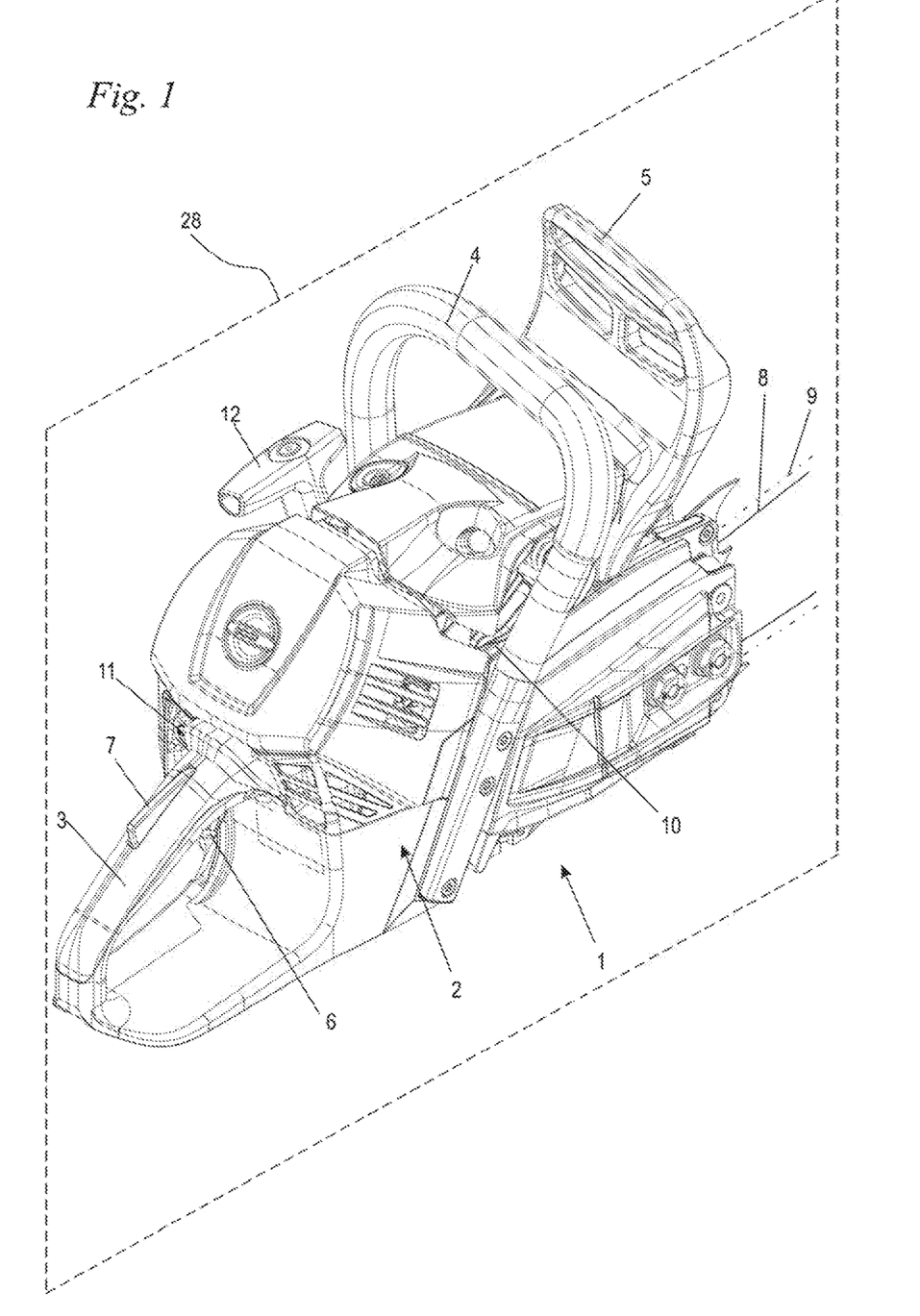
FIG. 1 is a perspective illustration of a work apparatus.

FIG. 1 shows, in a perspective illustration, a work apparatus 1 which, in the embodiment, is configured as a power saw. The work apparatus 1 may also be some other handheld work apparatus such as for example an angle grinder, a brush cutter, a blowing apparatus or the like. In the case of a blowing apparatus, the blower wheel for conveying working air forms the tool.

The work apparatus 1 has a housing 2 which, in the embodiment, is assembled from multiple components. For guiding the work apparatus 1 during operation, a rear handle 3 and a bale handle 4 are provided. A throttle trigger 6 and a throttle trigger lock 7 are mounted pivotably on the rear handle 3. The work apparatus 1 has a guide bar 8, which is shown schematically in FIG. 1 and on which a saw chain 9, which is likewise schematically illustrated, is driven in circulating fashion. The saw chain 9 forms the tool of the work apparatus 1 and is driven by a combustion engine 10 arranged in the housing 2. A hand protector 5 runs on that side of the bale handle 4 which faces toward the guide bar 8. The hand protector 5 may advantageously be mounted pivotably, and serves for triggering a chain brake device. As is also shown in FIG. 1, a stop button 11 is arranged on the housing 2 adjacent to the rear handle 3, via which stop button an operator can switch off the combustion engine 10. To start the combustion engine 10, a pull-rope starter 13 (FIG. 3) which is not shown in FIG. 1 is provided, the start handle 12 of which pull-rope starter projects out of the housing 2. Also schematically shown in FIG. 1 is a longitudinal center plane 28 of the work apparatus, which in the embodiment runs parallel to the plane of the guide bar 8. The profile of the longitudinal center plane 28 will be described in more detail below.

Figure 2:
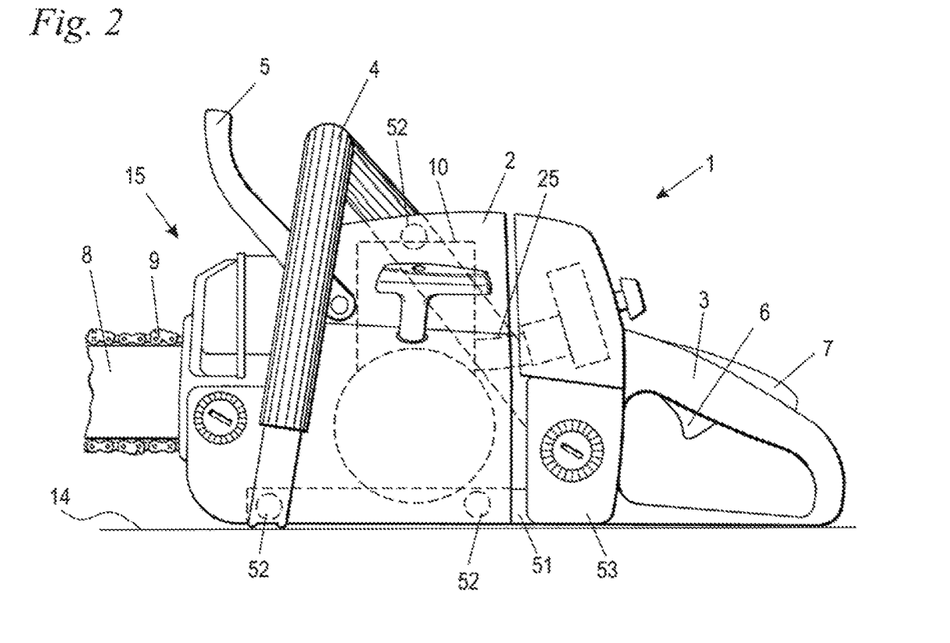
FIG. 2 shows a schematic side view of the work apparatus from FIG. 1.

FIG. 2 shows the work apparatus 1 in a rest position 15, in which the work apparatus 1 is resting on a horizontal, planar rest surface 14. In the embodiment, the work apparatus 1 lies on the rest surface 14 by way of a section of the bale handle 4 which runs on the bottom side of the work apparatus 1 and by way of the bottom side of the housing 2 in the region of the rear handle 3. The housing 2 includes a handle housing 51 which is connected to the combustion engine 10 via anti-vibration elements 52. The anti-vibration elements 52 are shown schematically in FIG. 2. Via the anti-vibration elements 52, the handle housing 51 is decoupled, with vibration-damping action, from the combustion engine 10. The rear handle 3 and the bale handle 4 are arranged on the handle housing 51. In the embodiment, the handle housing 51 also includes a fuel tank 53. The fuel tank 53 can preferably be formed integrally with the handle housing 51. The handle housing 51 may therefore also be referred to as a tank housing.

Figure 3:
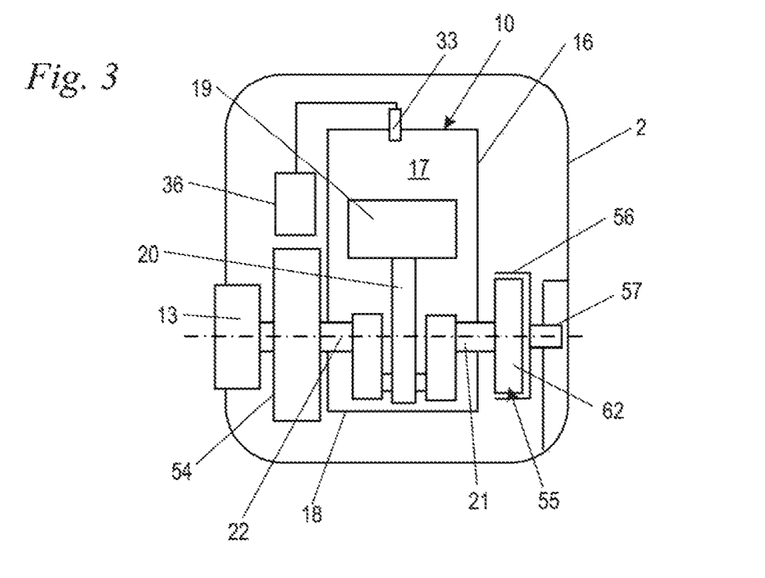
FIG. 3 is a schematic sectional illustration through the work apparatus from FIGS. 1 and 2.

FIG. 3 shows the construction of the drive of the saw chain 9 in detail. The pull-rope starter 13 is shown schematically in FIG. 3. The work apparatus 1 has a fan wheel 54 which serves for conveying cooling air for the combustion engine 10. The fan wheel 54 is connected rotationally conjointly to a crankshaft 21 of the combustion engine 10. The combustion engine 10 has a cylinder 16 in which a combustion chamber 17 is formed. The combustion chamber 17 is delimited by a piston 19 which is mounted so as to move in reciprocating fashion in the cylinder 16. Via a connecting rod 20, the piston 19 drives the crankshaft 21 in rotation about a rotational axis 22. A spark plug 33 projects into the combustion chamber 17. The spark plug 33 is activated by a control device 36. The control device 36 may include a magnet ignition device in which the energy for triggering the ignition spark is induced by magnets (not shown) which are arranged on the outer circumference of the fan wheel 54. In an alternative embodiment, the control device 36 may be supplied with energy by a generator. The control device 36 defines whether an ignition spark is triggered and at what time of an engine cycle the ignition spark is generated.

The crankshaft 21 is connected via a centrifugal clutch 55 to a drive pinion 57 which drives the saw chain 9 (FIG. 2). The drive pinion 57 is connected to an output part 56 of the centrifugal clutch 55, in the embodiment a clutch drum. The centrifugal clutch 55 furthermore includes a drive part 62, which is connected rotationally conjointly to the crankshaft 21. The drive part 62 can advantageously include centrifugal weights (not shown) which, above a clutch-engagement rotational speed range, produce a rotationally conjoint connection between drive part 62 and output part 56.

Figure 4:
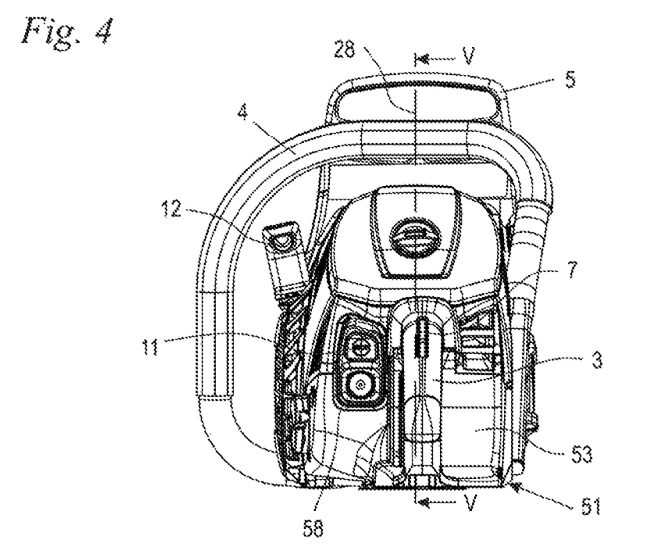
FIG. 4 shows a side view of the work apparatus as viewed from the side of the rear handle.

FIG. 4 shows the stop button 11. In the embodiment, a purger bellows 58 is arranged below the stop button 11. To flush the fuel system, the operator can actuate the purger bellows 58 before cranking the combustion engine 10. As is also shown in FIGS. 1 and 4, no elements for the engagement of a starting position, such as for example an operating mode setting means or the like, are provided.

Figure 5:
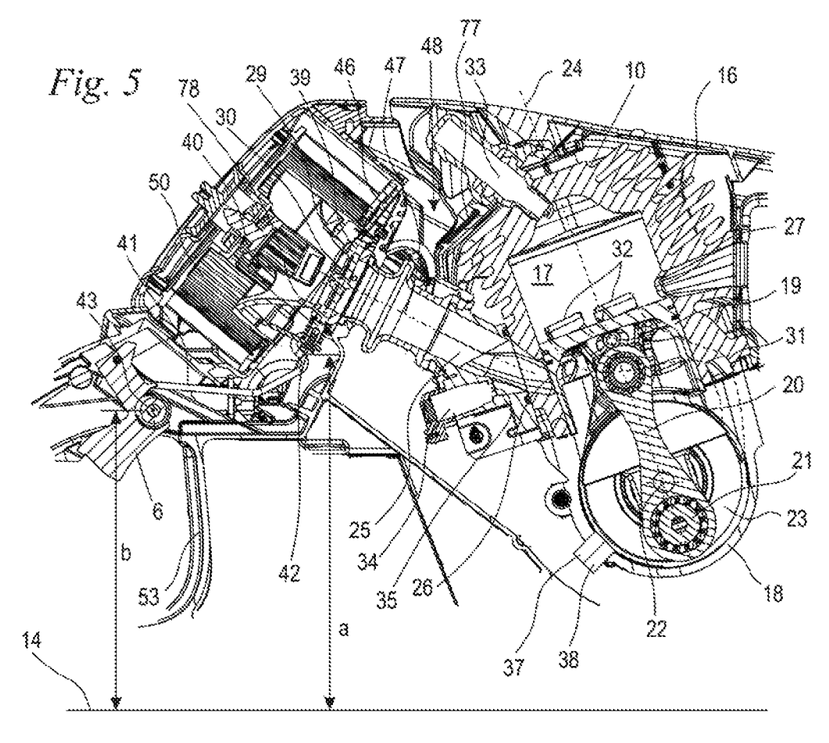
FIG. 5 is a detail sectional illustration through the work apparatus along the line V-V in FIG. 4.

FIGS. 4 and 5 also show the position of the longitudinal center plane 28. As shown in FIG. 4, the longitudinal center plane 28 runs, in the embodiment, in the longitudinal direction of the rear handle 3 and transversely with respect to the bale handle 4. The longitudinal center plane 28 includes a cylinder longitudinal axis 24 shown in FIG. 5.

FIG. 5 shows the construction of the combustion engine 10 in detail. The combustion engine 10 has an intake channel 25 via which combustion air is drawn in during operation. The intake channel 25 has an intake channel longitudinal axis 47. The intake channel longitudinal axis 47 connects the centers of areas of the intake channel area in all sections perpendicular to the flow direction in the intake channel 25. The intake channel 25 is connected to the clean chamber of an air filter 50. In the intake channel 25, in the embodiment adjacent to the inlet into the intake channel 25, a throttle element 30 is arranged in the intake channel 25. The throttle element 30 is mounted in a throttle housing 29 so as to be pivotable about a bearing shaft axis 78. The throttle housing 29 is fixed to a partition wall 46. The partition wall 46 can advantageously be formed in one piece with the fuel tank 53. The partition wall 46 separates the chamber in which the filter 50 is arranged from an intermediate chamber 48. The intermediate chamber 48 is in turn separated via a partition wall 77 from the cylinder 16 of the combustion engine 10. The intermediate chamber 48 and the partition walls 46 and 77 give rise to improved thermal decoupling between the air filter 50 and the combustion engine 10.

The throttle housing 29 can advantageously, like the handle 3, be fixed to the handle housing 51, and thus decoupled in terms of vibrations from the combustion engine 10 via the anti-vibration elements 52. The handle 3 and the throttle housing 29 are fixedly connected to one another.

On the intake channel 25, there is arranged a fuel valve 34, which is schematically shown in FIG. 5. The fuel valve 34 has a discharge opening 35 (likewise schematically shown) into the intake channel 25. The discharge opening 35 of the fuel valve 34 discharges into the intake channel 25 downstream of the throttle element 30. Here, the expression "downstream" relates to the flow direction from the air filter 50 to the crankcase interior 23. The combustion engine 10 can preferably have only a single fuel valve 34. The entire fuel quantity to be supplied to the combustion engine is supplied via the preferably single fuel valve 34. The intake channel 25 discharges with an inlet window 26 at a cylinder bore of the cylinder 16. The inlet window 26 may advantageously be controlled by the piston 19. The inlet window 26 is opened to a crankcase interior 23 during the upward stroke of the piston 19, when the piston 19 is in the region of top dead center.

FIG. 5 shows the piston 19 at bottom dead center. At bottom dead center, the piston 19 overlaps the inlet window 26 and closes the inlet window 26. The crankcase 18 has a crankcase interior 23 in which the crankshaft 21 is arranged. The crankcase interior 23 is, when the piston 19 is in the region of the bottom dead center, connected to the combustion chamber 17 via one or more transfer channels 31. In the embodiment, it can be advantageous for one transfer channel 31 to be provided which, in the direction of the combustion chamber 17, splits into multiple branches and discharges into the combustion chamber 17 via multiple transfer windows 32. Some other configuration of one or more transfer channels 31 may also be advantageous. An outlet window 27 leads out of the combustion chamber 17. The outlet window 27 may advantageously likewise be controlled by the piston 19.

As is also shown in FIG. 5, a pressure sensor 37 and a temperature sensor 38 are arranged on the crankcase 18. The pressure sensor 37 and the temperature sensor 38 are, in an advantageous embodiment, configured as a combined pressure-temperature sensor. The pressure sensor 37 measures the pressure in the crankcase interior 23. The temperature sensor 38 measures the temperature in the crankcase interior 23. The temperature determined by the temperature sensor 38 is utilized by the control device 36 to suitably set the fuel quantity to be supplied and the ignition time ZZP.

For the actuation of the throttle element 30, a throttle linkage 41 is provided which is connected to a coupling section 40 of a bearing shaft 39 of the throttle element 30. The other end of the throttle linkage 41 is hooked onto the throttle trigger 6. The throttle trigger 6 is mounted so as to be pivotable about a pivot axis 43. In the rest position 15, the bearing shaft 39 of the throttle element 30 lies higher than the pivot axis 43 of the throttle trigger 6. The spacing a of the coupling section 40 to the rest surface 14 is at least as great as the spacing b of the pivot axis 43 to the rest surface 14. Here, the spacing a is measured from an end 42, which projects out of the throttle housing 29 and which faces toward the rest surface 14, of the bearing shaft 39. In the embodiment, the end 42 of the bearing shaft 39 is formed by a screwed-in fastening screw.

Figure 6:
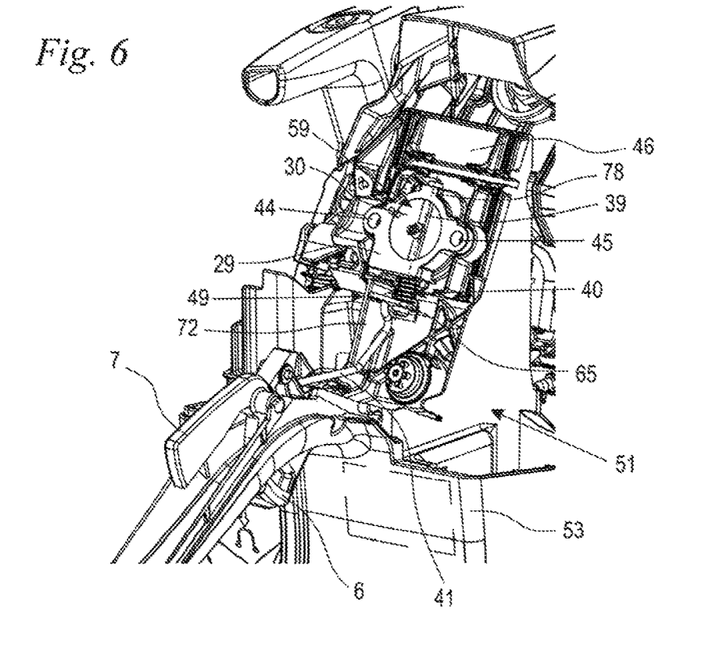
FIG. 6 and FIG. 7 are perspective illustrations of the region of the throttle element and of the throttle linkage of the work apparatus, with the housing cover and air filter having been dismounted.
Figure 7:
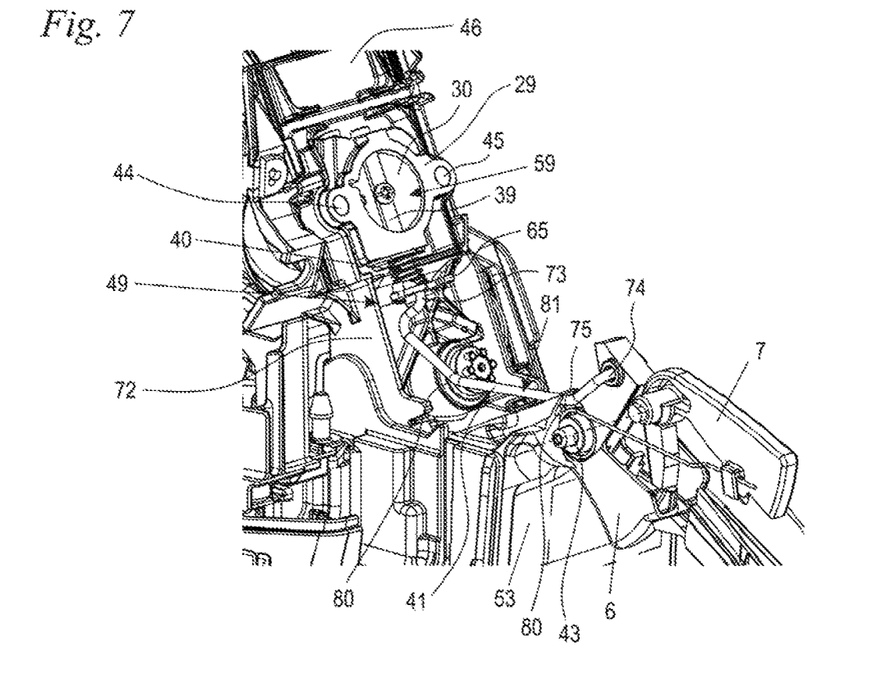

FIGS. 6 and 7 show the arrangement of the throttle linkage 41 in detail. As shown in FIG. 6, the throttle linkage 41 is hooked onto a throttle lever 65, which is connected rotationally, conjointly to the bearing shaft 39. The throttle lever 65 is in this case fixed to the coupling section 40 of the bearing shaft 39. The throttle housing 29 is fixed to the partition wall 46 at two fastening points 44 and 45. For this purpose, fastening bolts are provided which are not shown in the figures. As shown in FIGS. 6 and 7, the fastening points 44 and 45 are arranged symmetrically with respect to a plane which includes the intake channel longitudinal axis 47 (FIG. 5) and the bearing shaft axis 78 of the bearing shaft 39. The bearing shaft axis 78 is shown in FIGS. 6 and 5.

As is also shown in FIG. 6, a web 72 is formed on the handle housing 51, specifically on the partition wall 46, which may advantageously be formed in one piece with the fuel tank 53. The web 72 runs, in the embodiment, approximately parallel to the longitudinal center plane 28 (FIG. 1) and to the bearing shaft 39 of the throttle element 30. On the web 72, there can preferably be provided a stop 49 for the coupling element 65. The stop 49 can advantageously define the fully open position of the throttle element 30. By virtue of the fact that the stop 49 for the fully open position of the throttle element 30 is formed on the handle housing 51 on which the throttle trigger 6 is also mounted, there are low resulting position tolerances between the throttle trigger 6 and the full-load position of the throttle element 30.

As shown in FIG. 7, the throttle linkage 41 has a first end 73, which is hooked onto the throttle lever 65. A second end 74 of the throttle linkage 41 is hooked onto the throttle trigger 6. On the handle housing 51, close to the pivot axis 43 of the throttle trigger 6 there is formed a side guide 75 for the throttle linkage 41. During an actuation movement of the throttle trigger 6, the throttle linkage 41 can, owing to the side guide 75, move only parallel to the longitudinal center plane 28 (FIG. 1), but not transversely with respect to the longitudinal center plane 28. The throttle linkage 41 runs substantially parallel to the longitudinal center plane 28. The throttle linkage 41 may advantageously run substantially in the longitudinal center plane 28 or with a small spacing to the longitudinal center plane 28. The throttle linkage 41 is, owing to the small spacing between the throttle trigger 6 and the coupling section 40, of relatively short form. The throttle linkage 41 has two bends 80 which have the effect that a central section 81 of the throttle linkage 41 is, in the rest position 15, situated closer to the rest surface 14 than the ends 73 and 74. In this way, the throttle linkage 41 can be led through under the air filter 50. In the rest position 15, the central section 81 also lies above the fuel tank 53.

Figure 8:
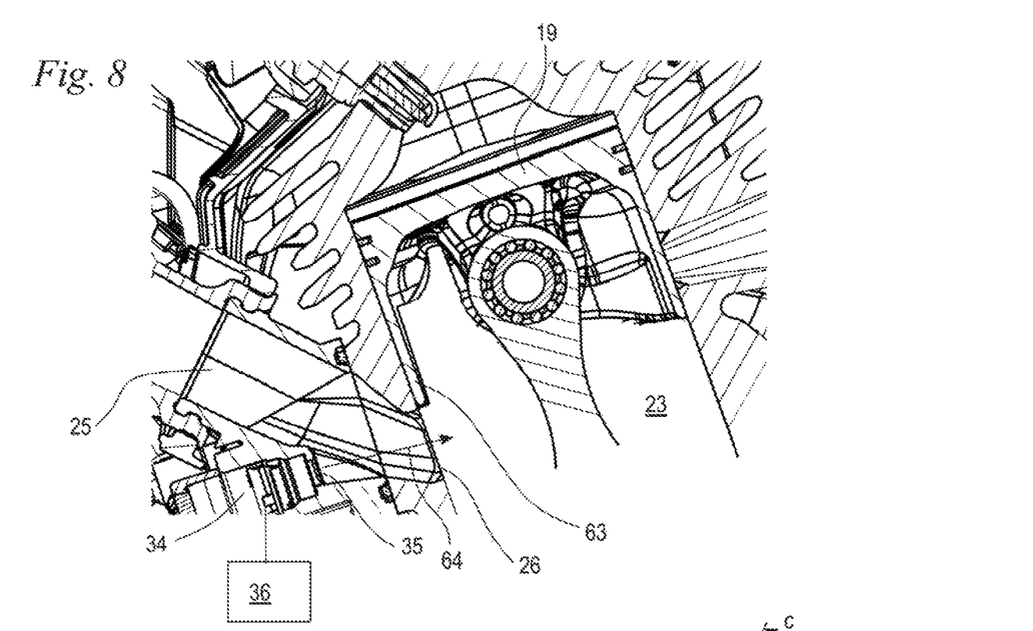
FIG. 8 is a detail sectional illustration corresponding to FIG. 5 with the piston at top dead center.

FIG. 8 shows the piston 19 at top dead center. In this position, a piston skirt 63 of the piston 19 may advantageously completely open up the inlet window 26 of the intake channel 25. The fuel valve 34 is oriented with its discharge opening 35 such that fuel can enter the crankcase interior 23 in a straight line through the intake channel 25 and through the inlet window 26 along the arrow 64 indicated in FIG. 8. In this way, in particular in the idling state, wetting of the walls of the intake channel 25 with fuel can be substantially prevented. In the idling state, the air quantity and flow speed are usually low, such that no atomization or no significant atomization takes place at the discharge opening 35 of the fuel valve 34. Therefore, in particular in the idling state, an orientation of the discharge opening 35 such that the fuel does not make contact with walls of the intake channel 25 before entering the crankcase interior 23 can be advantageous.

In order to achieve good mixture preparation and atomization in particular at full load, the discharge opening 35 can advantageously be oriented such that the fuel emerges from the discharge opening 35 transversely with respect to the flow direction in the intake channel 25. The angle between the arrow 64, in the direction of which the fuel emerges from the discharge opening 35, and the flow direction in the intake channel may advantageously be 20° to 160°. In an advantageous alternative embodiment, the fuel valve 34 is oriented such that the outlet direction of the fuel is approximately perpendicular to the flow direction of the intake channel.

Owing to the pulsations that arise in the intake channel 25 during operation, the opening time of the fuel valve 34 may advantageously be coordinated with the position of the piston 19. Here, the fuel valve 34 may also open before the opening or after the closing of the inlet window 26 if, owing to the pulsations in the intake channel 25, there are corresponding resulting delays in the supply of the fuel into the crankcase interior 23. As is schematically shown in FIG. 8, the fuel valve 34 is connected to the control device 36 and is activated by the latter.

FIGS. 6 and 7 show the throttle element 30 in a first end position 59, which is assigned to the idling state. In the first end position 59, the intake channel 25 is closed by the throttle element 30 aside from a residual cross section, which is formed by an opening 61 described in more detail below, and aside from a bypass channel 76 (FIG. 11) described in more detail below. Provision may also be made for the throttle element 30 not to have an opening, and for the residual cross section of the intake channel 25 in the first end position 59 of the throttle element 30 to be formed exclusively by one or more bypass channels 76.

Figures 9, 10:
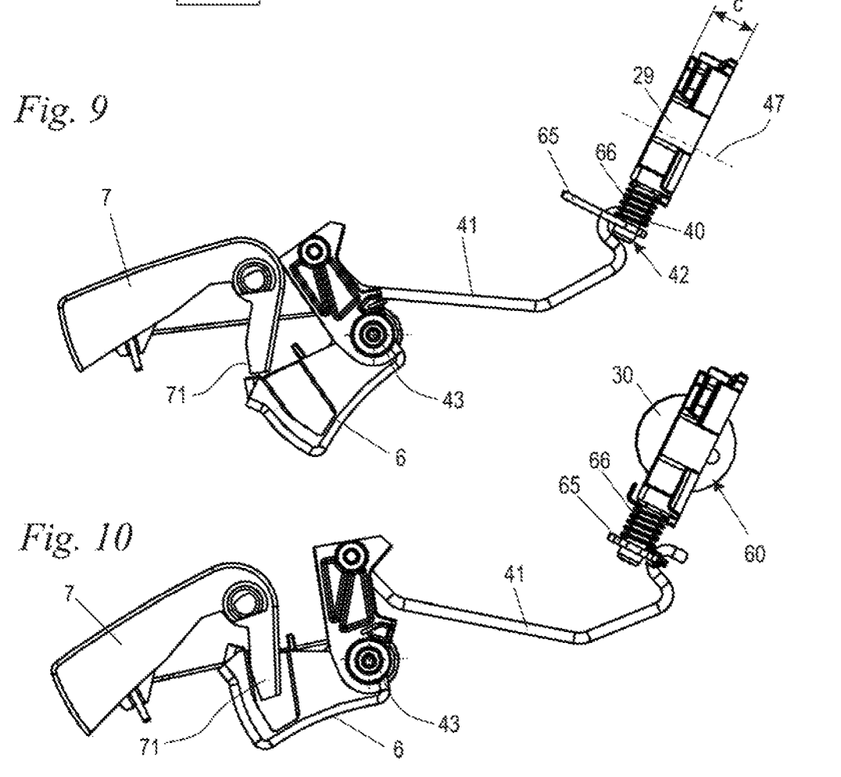
FIG. 9 shows a side view of throttle housing, throttle linkage, throttle trigger and throttle trigger lock in a first end position of the throttle element.
FIG. 10 shows a side view of the arrangement from FIG. 9 in a second end position of the throttle element.

FIG. 9 shows the arrangement of throttle linkage 41, throttle trigger 6 and throttle trigger lock 7 in the first end position 59 of the throttle element 30. The throttle trigger lock 7 has a blocking section 71 which, in the non-actuated position of the throttle trigger lock 7, blocks an actuation of the throttle trigger 6, that is, a pivoting of the throttle trigger 6 clockwise in FIG. 9. The throttle lever 65 is acted on by a return spring 66 which acts on a stop (not shown), formed on the housing 2 (FIG. 1), for the throttle trigger 6. The stop on the housing 2 defines the first end position 59 of the throttle element 30. As is also shown in FIG. 9, the throttle housing 29 has a thickness c measured parallel to the intake channel longitudinal axis 47.

FIG. 10 shows the arrangement in a second end position 60 of the throttle element 30. In the second end position 60, the throttle element 30 is open to a maximum extent and can advantageously lie approximately parallel to the intake channel longitudinal axis 47 (FIG. 5). The second end position 60 is defined by the stop 49 (FIGS. 6 and 7), which prevents a further pivoting of the throttle lever 65. As shown in FIG. 10, the blocking section 71 projects, in the actuated position of throttle trigger lock 7 and throttle trigger 6, into a pocket formed in the throttle trigger 6, and thus permits the pivoting of the throttle trigger 6 about its pivot axis 43. The second end position 60 is assigned to the full-load state.

Figure 11:
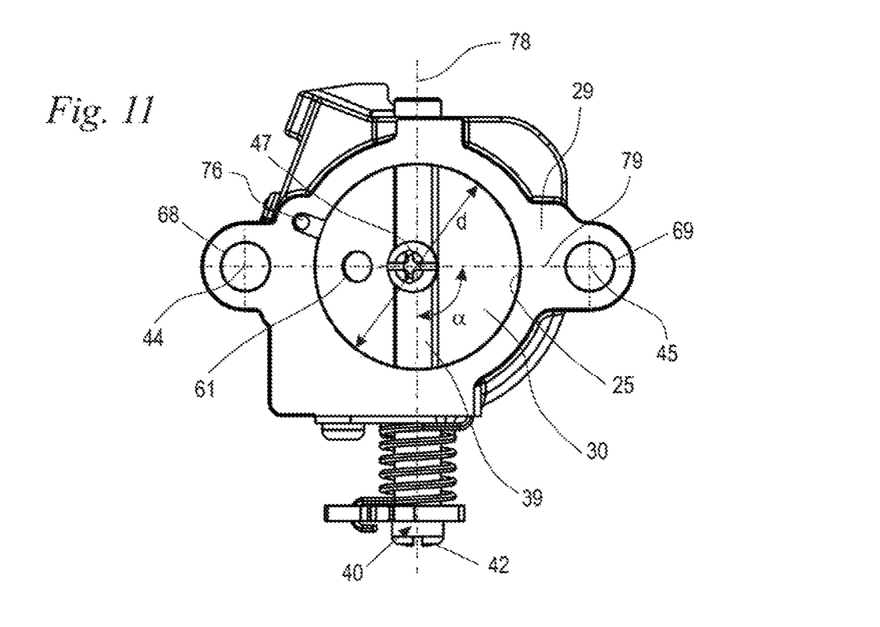
FIG. 11 shows a side view of the throttle housing with throttle element arranged therein.
Figure 12:
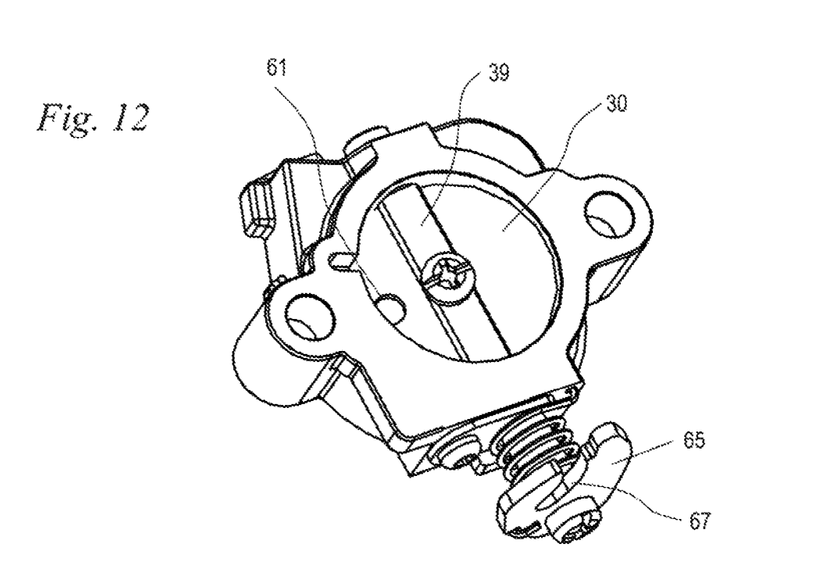
FIG. 12 is a perspective illustration of throttle housing and throttle element.

FIGS. 11 and 12 show the embodiment of the throttle element 30 and of the throttle housing 29 in detail. The throttle housing 29 has two fastening openings 68 and 69, which in the embodiment are formed as bores with a circular cross section. The longitudinal central axes of the openings 68 and 69 form the fastening points 44 and 45. The intake channel 25 has, in the throttle housing 29, a diameter d which is considerably smaller than the thickness c (FIG. 9) of the throttle housing 29. The thickness c of the throttle housing 29 can advantageously be smaller than 0.5 times the diameter d of the intake channel 25 in the throttle housing 29. The diameter d of the intake channel 25 is constant in the throttle housing 29. The coupling section 40 has a central axis which, as shown in FIG. 11, coincides with the bearing shaft axis 78 of the bearing shaft 39. FIG. 11 shows the arrangement approximately in the viewing direction of the intake channel longitudinal axis 47. In this viewing direction, the two fastening points 44 and 45 lie on a connecting line 79 which runs perpendicular to the bearing shaft axis 78. The connecting line 79, which connects in each case one fastening point 44 or 45 to the intake channel longitudinal axis 47 in this viewing direction, runs at an angle $\alpha$, which can advantageously be 80° to 100°, with respect to the bearing shaft axis 78. In the embodiment, the angle $\alpha$ is 90°. The fastening points 44 and 45 are formed symmetrically with respect to a plane which includes the bearing shaft axis 78 and the intake channel longitudinal axis 47. As is also shown in FIGS. 11 and 12, the throttle element 30 has an opening 61. The opening 61 has a defined diameter. Also formed in the throttle housing 29 is a bypass channel 76, which forms a bypass past the throttle element 30. The bypass channel 76 can advantageously have a setting element (not shown) via which the free flow cross section of the bypass channel 76 can be exactly set during the production of the work apparatus 1. The opening 61 and the bypass channel 76 define the free flow cross section of the intake channel 25 when the throttle element 30 is in the first end position 59. In the embodiment, exactly one opening 61 is provided in the throttle element 30. It may however also be advantageous for some other number of openings 61 to be provided in the throttle element 30 in order to define a defined flow cross section.

As shown in FIG. 12, the throttle lever 65 has a slot 67 into which the throttle linkage 41 can be hooked by way of the end 73 thereof.

Figure 13:
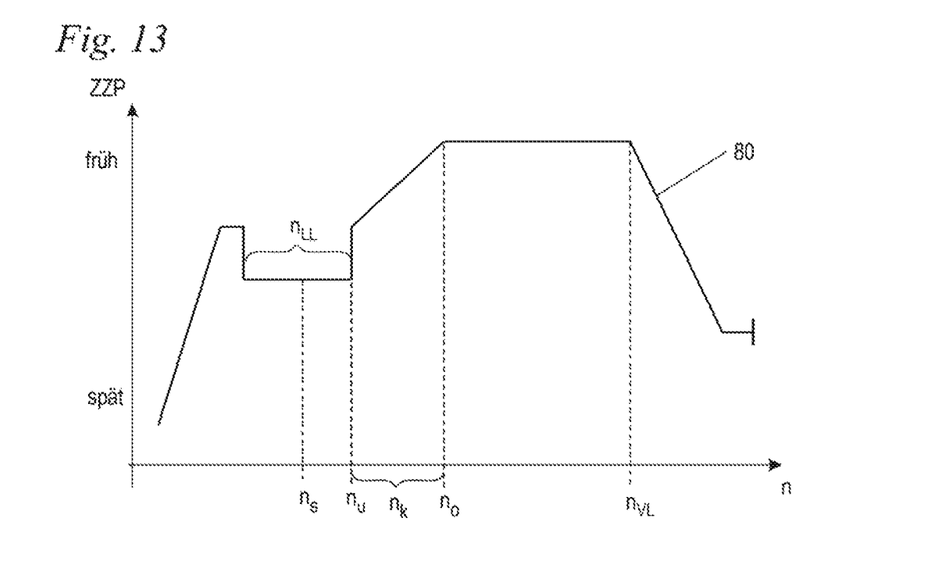
FIG. 13 shows a schematic diagram which shows, by way of example, one possible profile of the ignition timing versus the rotational speed of the combustion engine.

FIG. 13 shows a diagram illustrating the control of the ignition time ZZP versus the rotational speed n of the combustion engine 10. As shown in FIG. 13, low values for the ignition time ZZP in the diagram signify a retarded ignition time ZZP, and high values for the ignition time ZZP in the diagram signify an advanced ignition time ZZP. The ignition time ZZP is plotted versus the rotational speed n as line 80. As shown in FIG. 13, the combustion engine 10 has an idling rotational speed range $n_{LL}$ which extends to a clutch-engagement rotational speed range $n_k$. The clutch-engagement rotational speed range $n_k$ extends from a lower clutch-engagement rotational speed $n_u$ to an upper clutch-engagement rotational speed $n_o$. From the upper clutch-engagement rotational speed $n_o$ up to a full-load rotational speed $n_{VL}$, the ignition time ZZP remains constant at an advanced value. The full-load rotational speed $n_{VL}$ is adjoined by a speed regulation rotational speed range, at which the ignition time ZZP is "retarded" in order to limit the rotational speed.

The control device 36 of the work apparatus 1 activates the spark plug 33 and the fuel valve 34. The work apparatus 1 has a starting mode, in which the combustion engine 10 can be started via the pull-rope starter 13. The work apparatus 1 furthermore has an operating mode, in which the operator can activate the combustion engine 10 by actuation of the throttle trigger 6, that is, by adjustment of the throttle element 30, in order to vary the rotational speed n of the combustion engine 10. The throttle element 30 is the only adjustable throttle element arranged in the intake channel 25. No choke element is provided. In the starting mode, the throttle element 30 is situated in the first end position 59 (FIG. 11), in which the throttle element 30 closes the flow cross section in the intake channel 25 aside from the cross section of the opening 61, for as long as the operator does not actuate the throttle trigger 6. An adjustment of the throttle element 30 in the starting mode, for example via mechanical or electrical devices or by the operator, is not provided. The operating mode and the starting mode of the work apparatus 1 are, in the embodiment, starting modes of the control device 36, and differ only in terms of the control, via the control device, of the ignition time ZZP and of the fuel quantity to be supplied.

To switch off the combustion engine 10, the operator actuates the stop button 11. In this way, the ignition is short-circuited, and the control device 36 receives the signal that the combustion engine 10 is to be stopped.

Since the work apparatus 1 is in the starting mode again after being switched off via the stop button 11, the work apparatus 1 can be started at any time by cranking the combustion engine 10 using the start handle 12. No starting device has to be actuated for this purpose. After a relatively long period of the combustion engine 10 being deactivated, it may merely be necessary to manually flood the fuel system, specifically by actuating the purger bellows 58. During the starting process, the rotational speed n is controlled by the control device 36 such that the rotational speed n remains limited to a starting rotational speed $n_S$. The rotational speed n therefore cannot increase beyond the starting rotational speed $n_S$ in the starting mode. The starting rotational speed $n_S$ lies, in the embodiment, in the idling rotational speed range $n_{LL}$. The starting rotational speed $n_S$ is accordingly below the lower clutch-engagement rotational speed $n_u$. The lower clutch-engagement rotational speed $n_u$ may advantageously lie at least 25% above the starting rotational speed $n_S$. It is thus ensured that a tool of the work apparatus 1 cannot be driven via the crankshaft 21 and the centrifugal clutch 55 during the starting process.

Figure 14:
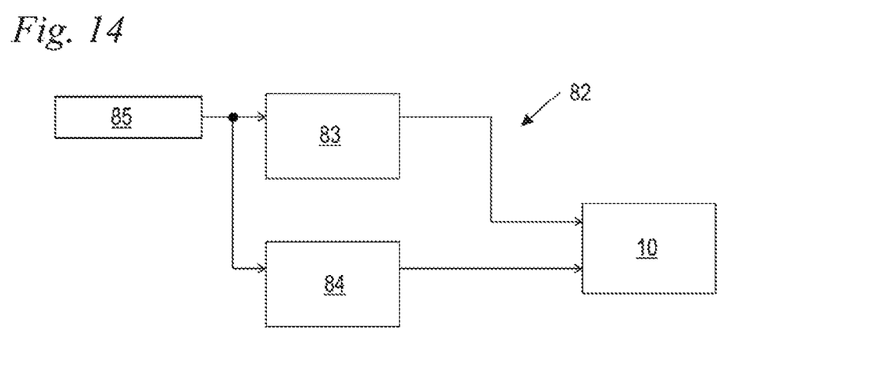
FIG. 14 shows a schematic block circuit diagram of a start controller.

FIG. 14 schematically shows the control of fuel quantity and ignition time in the starting mode of the control device 36. Before the first combustion, it is advantageously the case that standard values are provided for the ignition time and fuel quantity to be supplied, which standard values are stored in the control device 36. After the first combustion, the fuel quantity and ignition time may advantageously be controlled in accordance with the start controller 82 shown in FIG. 14. The start controller 82 has an ignition timing controller 83, for example a PI controller, which controls the ignition time on the basis of an input quantity 85. The start controller 82 furthermore has a fuel regulator 84, which regulates the fuel quantity to be supplied and which may likewise be configured as a PI controller. The fuel regulator 84 regulates the fuel quantity to be supplied likewise on the basis of the input quantity 85. The fuel quantity to be supplied, and the determined ignition time ZZP, are utilized for the activation of the combustion engine 10. The rotational speed of the combustion engine 10 is detected and serves once again as input quantity 85 for the start controller 82, until the start controller 82 is deactivated. Other variables such as temperature and pressure may also serve as input quantity 85.

After the starting, provision is made for the work apparatus 1 to be automatically adjusted from the starting mode into the operating mode when the throttle element 30 is adjusted by the operator from the first end position 59 in the direction of the second end position 60. The adjustment of the throttle element 30 from the first end position 59 in the direction of the second end position 60 can advantageously be detected via the pressure sensor 37. When the throttle element 30 is opened, the pressure in the crankcase interior 23 changes. This is detected by the pressure sensor 37. Here, the pressure sensor 37 may be arranged in the crankcase interior 23 or in the intake channel 25 downstream of the throttle element 30. A temperature detected by the temperature sensor 38, and/or the pressure in the crankcase interior 23, may also be utilized for the deactivation of the starting mode of the control device 36.

In an alternative embodiment, provision is made whereby, as an additional condition for an adjustment of the work apparatus 1 from the starting mode into the operating mode, at least one combustion must have taken place in the combustion chamber 17 of the combustion engine 10. An adjustment of the work apparatus 1 from the starting mode into the operating mode may advantageously takes place at the earliest when a predefined number of engine cycles has taken place after the first combustion of the combustion engine 10 after the starting process. The predefined number of engine cycles can advantageously be 5 engine cycles to 100 engine cycles. Only when the predefined number of engine cycles, which is in particular stored in the control device 36, has been run through does an adjustment of the throttle element 30 by the operator from the first end position 59 in the direction of the second end position 60 have the effect that the working apparatus 1, in particular the control device 36, is adjusted from the starting mode into the operating mode. Here, provision may also be made whereby, after the predefined number of engine cycles has taken place after the first combustion, a prior adjustment of the throttle element 30 by the operator from the first end position 59 in the direction of the second end position 60, which has taken place during the predefined number of engine cycles, effects an adjustment from the starting mode into the operating mode.

After the adjustment into the operating mode, the control device 36 activates the combustion engine 10 such that the rotational speed n can increase above the starting rotational speed $n_S$ and above the lower clutch-engagement rotational speed $n_u$. Below the lower clutch-engagement rotational speed $n_u$, the output part 56 of the centrifugal clutch 55 is not driven by the drive part 62. Between the lower clutch-engagement rotational speed $n_u$ and the upper clutch-engagement rotational speed $n_o$, the drive part 62 and the output part 56 come into contact, and the output part 56 is driven along by the drive part 62 with increasing rotational speed. At the upper clutch-engagement rotational speed $n_o$, drive part 62 and output part 56 have the same rotational speed n and are coupled to one another.

Figure 15:
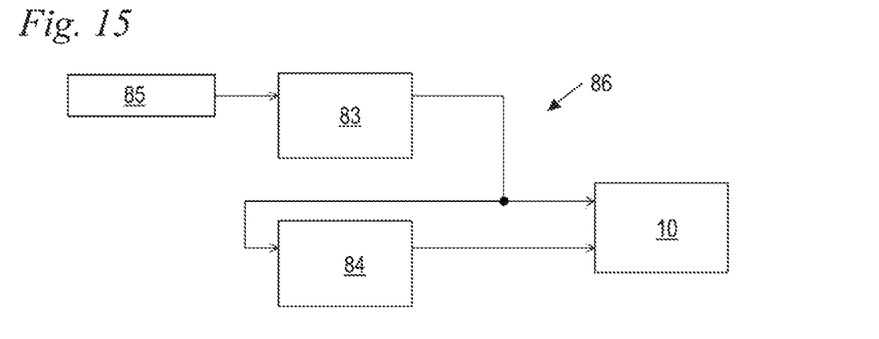
FIG. 15 shows a schematic block circuit diagram of an operation controller.

FIG. 15 schematically shows an operation controller 86 which serves for the control of ignition time, and fuel quantity to be supplied, in the operating mode of the control device 36. The operation controller 86 has an ignition timing controller 83 and a fuel regulator 84. The fuel regulator and the ignition timing controller may be configured identically for the starting mode and the operating mode, or may be different controllers. The operation controller 86 is, by contrast to the start controller 82, in particular a cascaded controller. In the case of the operation controller 86, it is not the input quantity 85 that serves as input quantity for the fuel regulator 84 but rather the output quantity of the ignition timing controller 83.

The operation controller 86 may advantageously be provided for the idling state. At relatively high rotational speeds, in particular at full load, the fuel quantity and ignition time are, in an advantageous embodiment, determined via a characteristic map in the operating mode.

In an alternative embodiment, provision may be made for the control device 36 not to have a starting mode, but rather for the fuel quantity to be supplied and the ignition time to be controlled via the operation controller 86 also during the starting, that is, during the cranking process. The operation controller 86 is in this case provided in particular for low rotational speeds such as the starting process and the idling state. At high rotational speeds, some other form of control of fuel quantity and ignition time may be provided, in particular involving a characteristic map.

In an alternative embodiment, provision may be made for the fuel quantity and ignition time to be controlled via one or more characteristic curves or a characteristic map also in the idling state and during the starting process.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
a tool;
a combustion engine for driving said tool;
a manually actuated pull-rope starter for said combustion engine;
a stop button configured to be actuated by an operator for switching off said combustion engine;
a centrifugal clutch;
said combustion engine having a crankcase and a crankshaft mounted in said crankcase;
said crankshaft being operatively connected to said tool via said centrifugal clutch;
said combustion engine having an intake channel;
a throttle element arranged in said intake channel;
said combustion engine having a spark plug and a fuel valve;

a control device for activating said spark plug and said fuel valve;

said control device having a starting mode wherein said combustion engine can be started via said pull-rope starter;

said control device further having an operating mode wherein the operator can activate said combustion engine by adjustment of said throttle element in order to vary a rotational speed (n) of said combustion engine;

said operating mode and said starting mode differing in terms of control, via said control device, of ignition time (ZZP) and fuel quantity to be supplied; and, wherein, in the case of said combustion engine being started from a switched-off state, said control device is automatically in said starting mode.

2. The work apparatus of claim 1, wherein said operating mode and said starting mode of said control device differ only in terms of control, via said control device, of ignition time (ZZP) and fuel quantity to be supplied.

3. The work apparatus of claim 1, wherein said throttle element is the only controllable throttle element arranged in said intake channel.

4. The work apparatus of claim 1 further comprising:
a throttle trigger configured to be adjustable by the operator between a first end position and a second end position; and,
said first end position being assigned to an idling state and said second end position being assigned to a full-load state.

5. The work apparatus of claim 4, wherein said throttle element is disposed in said first end position during a starting process.

6. The work apparatus of claim 4, wherein said throttle element defines at least one opening which, in said first end position, provides a defined opening cross section.

7. The work apparatus of claim 4, wherein said control device is switched from said starting mode into said operating mode when said throttle element is adjusted by the operator from said first end position in the direction of said second end position.

8. The work apparatus of claim 7 further comprising:
a pressure sensor configured to detect a pressure of said combustion engine downstream of said throttle element; and,
wherein said pressure sensor is configured to detect the adjustment of said throttle element from said first end position in the direction of said second end position.

9. The work apparatus of claim 1, wherein said control device is adjusted from the starting mode into the operating mode at the earliest when at least one combustion has taken place.

10. The work apparatus of claim 1, wherein the control device is adjusted from the starting mode into the operating mode at the earliest when a predefined number of engine cycles have been run through after a first combustion, said predefined number of engine cycles lying in a range from 5 engine cycles to 100 engine cycles.

11. The work apparatus of claim 1, wherein said control device is configured to limit the rotational speed (n) of said combustion engine in said starting mode to a starting rotational speed ($n_S$).

12. The work apparatus of claim 11, wherein the limitation of the rotational speed (n) of said combustion engine in the starting mode is realized by at least one of adjustment of the ignition time (ZZP), suppression of the ignition spark, and by variation of the supplied fuel quantity.

13. The work apparatus of claim 9, wherein:
said centrifugal clutch has a clutch-engagement rotational speed range ($n_k$) bounded by a lower clutch-engagement rotational speed ($n_u$) and an upper clutch-engagement rotational speed ($n_o$);
said centrifugal clutch has a drive part and an output part;
said output part is not driven by said drive part below said lower clutch-engagement rotational speed ($n_u$);
said drive part and said output part have the same rotational speed (n) above said upper clutch-engagement rotational speed ($n_o$); and,
said lower clutch-engagement rotational speed ($n_u$) is at least 25% higher than a starting rotational speed ($n_S$).

14. The work apparatus of claim 1, wherein said crankcase defines a crankcase interior; and, said combustion engine has a temperature sensor configured to detect a temperature in said crankcase interior.

15. The work apparatus of claim 1, wherein said fuel valve has a discharge opening which discharges into said intake channel downstream of said throttle element.

16. The work apparatus of claim 1, wherein the entire fuel quantity to be supplied to said combustion engine is supplied via a single fuel valve.

17. The work apparatus of claim 1, wherein:
said combustion engine has a piston;
said crankcase defines a crankcase interior;
said intake channel discharges into said crankcase interior via an inlet window;
said inlet window is controlled by said piston of said combustion engine; and,
said fuel valve is configured to supply fuel through said intake channel into said crankcase interior when said inlet window is open.

18. A handheld work apparatus comprising:
a tool;
a combustion engine for driving said tool;
a manually actuated pull-rope starter for said combustion engine;
a stop button configured to be actuated by an operator for switching off said combustion engine;
a centrifugal clutch;
said combustion engine having a crankcase and a crankshaft mounted in said crankcase;
said crankshaft being operatively connected to said tool via said centrifugal clutch;
said combustion engine having an intake channel;
a throttle element arranged in said intake channel;
a throttle trigger defining a first end position and a second end position;
said throttle element being adjustable by the operator using said throttle trigger between said first end position and said second end position;
said first end position being assigned to an idling state and said second end position being assigned to a full-load state;
said combustion engine having a spark plug and a fuel valve;
a control device for activating said spark plug and said fuel valve;
said control device having a starting mode wherein said combustion engine can be started via said pull-rope starter;
said control device further having an operating mode wherein the operator can activate said combustion engine by adjustment of said throttle element in order to vary a rotational speed (n) of said combustion engine;

wherein said throttle element is the only controllable throttle element arranged in said intake channel; and, wherein said throttle element is disposed in said first end position during a starting process.

* * * * *